No. 885,593. PATENTED APR. 21, 1908.
E. J. EWING & T. M. SNYDER.
NUT LOCK.
APPLICATION FILED JAN. 25, 1908.
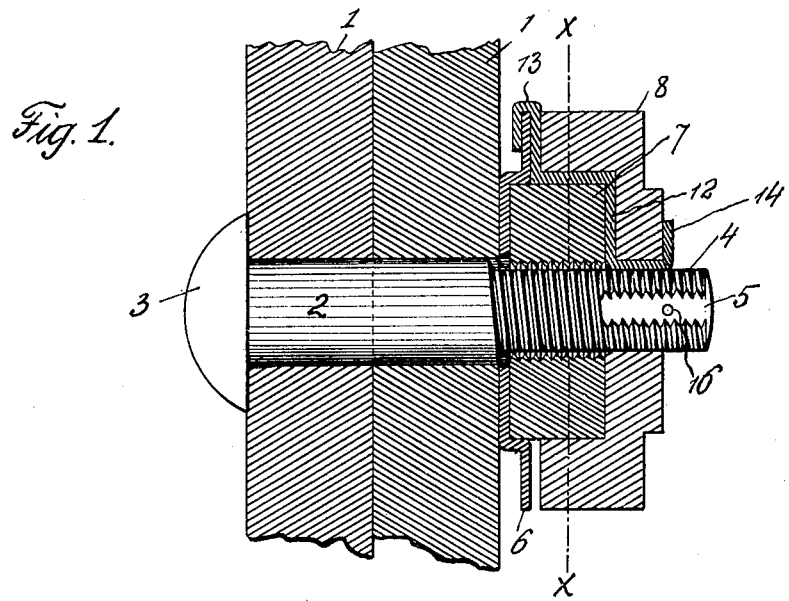
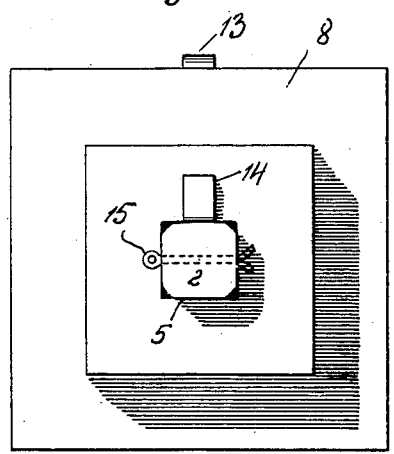
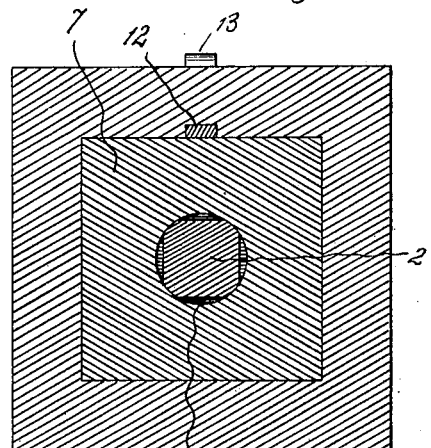
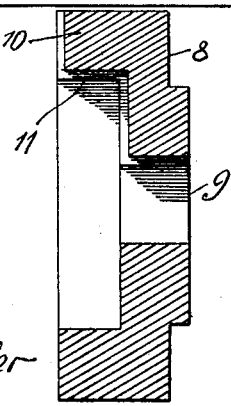
Witnesses
Inventors
E. J. Ewing and
T. M. Snyder,
By
Attorneys

UNITED STATES PATENT OFFICE.

EDWIN J. EWING AND THOMAS M. SNYDER, OF CORAOPOLIS, PENNSYLVANIA.

NUT-LOCK.

No. 885,593.  Specification of Letters Patent.  Patented April 21, 1908.

Application filed January 25, 1908. Serial No. 412,660.

*To all whom it may concern:*

Be it known that we, EDWIN J. EWING and THOMAS M. SNYDER, citizens of the United States of America, residing at Coraopolis, in the county of Allegheny and State of Pennsylvania, have invented certain new and useful Improvements in Nut-Locks, of which the following is a specification, reference being had therein to the accompanying drawing.

This invention relates to a nut lock, and the objects of our invention are; first, to provide positive and reliable means for locking a nut upon a bolt, whereby the nut cannot become accidentally disengaged therefrom; second, to provide a simple and inexpensive nut lock; and third, to provide a nut lock that can be removed without injuring the nut or bolt. We attain these objects by using a bolt provided with flat faces and adapted to engage the flat faces of the bolt is a cap for embracing a nut screwed upon the bolt. In connection with the nut and cap we use a novel washer and a malleable strip of metal for locking the cap upon the bolt and nut.

The detail construction entering into our invention will be presently described and then specifically pointed out in the appended claims.

In the drawings: Figure 1 is a longitudinal sectional view of our nut lock, partly in side elevation, Fig. 2 is a front elevation of the nut lock, Fig. 3 is a cross sectional view taken on the line $x$—$x$ of Fig. 1, and Fig. 4 is a detail sectional view of the cap.

In the accompanying drawings, we have illustrated two pieces of material 1 as having a bolt 2 passing therethrough, this bolt being provided with a head 3, and a screw threaded end 4. The threaded end of the bolt 4 is provided with diametrically opposed flat faces 5 mutilating the threads 4, whereby said threads will be diametrically opposed and, figuratively speaking, at the corners of the threaded end of the bolt.

Fitting upon the threaded end of the bolt and bearing against the material 1 is a saucer-shaped washer 6, which is held in engagement with the material 1 by a nut 7 screwed upon the threaded end of the bolt.

Fitting upon the threaded end of the bolt is a cap 8, said cap having a square opening 9 to receive the end of the bolt and flanges 10 for embracing the nut 7. This cap has its inner face provided with grooves 11 to receive a malleable piece of metal 12, which is bent, as at 13, to engage the saucer-shaped washer 6, and as at 14, to engage the outer face of the cap 8. Besides employing the malleable strip of metal 12 for holding the cap 8 in engagement with the nut 7, we employ a cotter pin 15 adapted to pass through an opening 16 provided therefor in the threaded end of the bolt. It will thus be observed that the malleable strip of metal 12 can be bent to release the cap 8 and permit of the nut 7 being removed, this nut being revoluble with the saucer-shaped washer 6 and easily removed after the cap and strip of metal 12 have been removed from the bolt. It is impossible for the cap to rotate due to the flat surfaces 5 of the bolt and the square opening 9 of said cap, consequently it will be impossible for the nut 7 to rotate upon the bolt, as the cap embraces said nut.

Our invention is applicable to rail joints or such structures subjected to vibrations which have the tendency to loosen nuts upon bolts.

We do not care to confine ourselves to the size, proportion or minor details of construction entering into our invention, and such changes as are permissible by the appended claims can be resorted to without departing from the spirit and scope of the invention.

Having now described our invention what we claim as new, is:—

1. In a nut lock, the combination of a bolt provided with flat faces, a saucer-shaped washer adapted to fit upon said bolt, a nut screwed upon said bolt and engaging said washer, a cap mounted upon said bolt for embracing said nut, a malleable strip of metal mounted in said cap for engaging said washer and the outer faces of said cap, and a cotter pin mounted in the end of said bolt.

2. In a nut lock, the combination of a bolt provided with flat faces, a saucer-shaped washer adapted to fit upon said bolt, a nut screwed upon said bolt and engaging said washer, a cap mounted upon said bolt for embracing said nut, and a malleable strip of metal mounted in said cap for engaging said washer and the outer faces of said cap.

In testimony whereof we affix our signatures in the presence of two witnesses.

EDWIN J. EWING.
THOMAS M. SNYDER.

Witnesses:
MAX H. SROLOVITZ,
C. V. BROOKS.